United States Patent
Lenord et al.

(10) Patent No.: US 8,113,339 B2
(45) Date of Patent: Feb. 14, 2012

(54) CHAIN CONVEYOR HAVING DAMPING DEVICE

(75) Inventors: Oliver Lenord, Aschaffenburg (DE); Yongbo Chen, Lohr an Main (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/842,157

(22) Filed: Jul. 23, 2010

(65) Prior Publication Data

US 2011/0094860 A1    Apr. 28, 2011

(30) Foreign Application Priority Data

Oct. 23, 2009    (DE) .......................... 10 2009 050 488

(51) Int. Cl.
*B65G 23/04* (2006.01)
(52) U.S. Cl. ........................................ 198/835; 198/832
(58) Field of Classification Search .................. 198/832, 198/835, 814
See application file for complete search history.

(56) References Cited

U.S. PATENT DOCUMENTS

| | | | | |
|---|---|---|---|---|
| 4,032,003 A | * | 6/1977 | Hull .............................. | 198/832 |
| 4,875,568 A | * | 10/1989 | Hermann et al. ............. | 198/335 |
| 4,961,492 A | | 10/1990 | Wiseman et al. | |
| 5,156,260 A | * | 10/1992 | Dorner et al. ................. | 198/835 |
| 5,857,136 A | * | 1/1999 | Yoneda et al. ................ | 198/835 |
| 5,871,085 A | * | 2/1999 | Yagi .............................. | 198/835 |
| 6,779,652 B2 | | 8/2004 | Baier et al. | |
| 7,347,320 B2 | * | 3/2008 | Isaman et al. ................ | 198/835 |
| 7,673,741 B2 | * | 3/2010 | Nemedi ........................ | 198/835 |
| 2005/0183932 A1 | | 8/2005 | Angleitner | |

FOREIGN PATENT DOCUMENTS

| | | |
|---|---|---|
| DE | 859 125 | 12/1952 |
| DE | 969 631 | 6/1958 |
| DE | 38 14 147 | 11/1989 |
| DE | 103 16 630 | 11/2004 |
| DE | 10 2007 054 730 | 5/2009 |
| EP | 0 664 261 | 7/1995 |
| EP | 1 564 165 | 8/2005 |
| SU | 1488216 | 6/1990 |

* cited by examiner

*Primary Examiner* — James R Bidwell
(74) *Attorney, Agent, or Firm* — Michael J. Striker

(57) ABSTRACT

A conveyor (10) includes at least one endless conveying device (20) having a conveying section (22) having a conveying surface (21), on which conveyed goods (11) can be conveyed. The conveying device (20) are held on a frame (12) using at least two deflection rollers (40), thereby enabling it to circulate endlessly. A driving wheel (51) with a rotary axle (52) is coupled to the conveying device (20) such that the former can be set into a rotational motion by the latter. The rotary axle (52) of the driving wheel (51) is coupled to the damping device (50) such that vibrations in the rotation of the conveying device (20) can be damped. The rotary axle (52) of the driving wheel (51) is supported on the frame (12) such that it can move with translatory motion. The damping device (50) can dampen a translatory motion of the rotary axle (52).

10 Claims, 1 Drawing Sheet

CHAIN CONVEYOR HAVING DAMPING DEVICE

CROSS REFERENCE

The invention described and claimed hereinbelow is also described in de 102009050488.5, filed Oct. 23, 2009. This German Patent Application, whose subject matter is incorporated here by reference, provides the basis for a claim of priority of invention under 35 U.S.C. 119 (a)-(d).

BACKGROUND OF THE INVENTION

The present invention relates generally to a conveyor.

A conveyor is known from SU 1 488 216 A1. According to FIG. 1 of SU 1 488 216 A1, the conveyor includes a plurality of endless conveying means in the form of leaf chains. The conveying means have a conveying section with a conveying surface on which conveyed goods 7, 8 can be transported. The conveyed goods are carried along by the conveying means with frictional engagement. The endless conveying means is held on a frame 1 using a plurality of rotatable deflection rollers 3, 4, 5, thereby enabling it to rotate endlessly. According to FIG. 2 in SU 1 488 216 A1, a driving wheel 12 having a rotary axle 11 is provided, the driving wheel 12 being coupled to the conveying means such that it be set into rotational motion by the conveying means. The rotary axle of the driving wheel is connected to a damping device 13, 14, 15, thereby enabling vibrations in the rotation of the conveying means to be damped.

Vibrations of that type occur mainly with long conveying means that include members having low stiffness. They have a low natural frequency under their own weight and, in particular, when tension is applied in the pulling direction of the drive; this natural frequency can be easily excited to become natural vibrations as a result of changing frictional conditions along the chain guidance. This is also referred to as stick-slip vibrations in this context.

The damping device described in SU 1 488 216 A1 includes an impeller 10 that runs in a viscous fluid 14, for example, oil, wherein the viscous fluid is accommodated in a closed chamber 13.

The disadvantage of this damping device is that it dampens the desired conveyance motion of the endless conveying means in addition to undesired oscillating motions. The drive of the conveying means must therefore be designed to be unnecessarily powerful. At the same time, a great deal of frictional heat is produced in the damping device, which heats up the damping device considerably, in particular when the conveying means move at high speed.

A further conveyor is known from EP 664 261 B1. In that case, the stick-slip vibration is ameliorated by a large damping mass. The above-described problem of frictional heat does not occur in this case. The disadvantage of this damping device is that the damping mass requires a great deal of space.

SUMMARY OF THE INVENTION

The object of the invention is to create a conveyor having a damping device, in the case of which additional frictional heat is not produced during normal operation, and in which the damping device is as compact as possible. It should be possible, in particular, to integrate the damping device in a conveyor having the design shown in U.S. Pat. No. 4,961,492 A in combination with a conveyor according to U.S. Pat. No. 6,779,652 B2.

In a conveyor according to the invention, the rotary axle of the driving wheel is supported on the frame such that it can move with translatory motion, wherein the damping device can dampen a translatory motion of the rotary axle. The rotary axle of the driving wheel is set into translatory motion only if rotary vibrations of the conveying means occur, while it remains in a fixed position during normal operation. Accordingly, the damping device is set into motion only if vibrations occur, and so additional frictional heat is produced only in this case. The rotational motion of the driving wheel is not braked by the damping device that is provided, thereby ensuring that the drive of the conveyor is not stressed unnecessarily.

In the case of a preferred conveyor, the conveying means include a return section that differs from the conveying section, the return section being disposed substantially parallel to the conveying section, wherein the driving wheel is disposed between the conveying section and the return section, the driving wheel being connected in a driving manner to the conveying section and to the return section. A conveyor having conveying means that includes a return section that extends parallel to the conveying section is known from U.S. Pat. No. 4,961,492 A which was mentioned above. Due to the proposed coupling of the driving wheel to the conveying section and the return section, the rotary axle of the driving wheel is moved in a translatory manner when the conveying section and the return section move at different speeds. This case occurs specifically when rotational vibrations occur in the conveying means since the sections do not all move at the same speed due to the elasticity of the conveying means. The damping device reduces the difference in speed between the conveying section and the return section, thereby damping the vibration of the conveying means. During normal operation of the conveyor, the conveying section and the return section run at the same speed, and so the rotary axle of the driving wheel does not move in a translatory manner, and the driving wheel can therefore rotate unencumbered with the conveying means.

In the case of a preferred conveyor, the damping device includes a spring, via which it is supported on the frame. Using the spring, a preload force can be impressed in the damping device, thereby eliminating any play that may be present between the conveying means and the driving wheel. Play of that type would greatly reduce the damping effect of the damping device. It is not necessary to provide friction-producing means in the proposed damping device since the friction between the conveying means and the frame is used to dampen vibrations. It is entirely adequate for the driving wheel, according to the invention, to be movably coupled to the conveying section and the return section without play in every operating state, which is achieved using the spring that is provided.

In the case of a preferred conveyor, the spring is supported on the frame using a displaceable stop. The endless conveying means becomes worn over time by the operation of the conveyor. In the case of conveying means designed as a conveying chain in particular, this wear causes the conveying means to gradually lengthen. This gradual lengthening can be compensated for by the displaceable stop, thereby preventing play from occurring between the driving wheel and the conveying means even if the conveying means become worn.

In the case of a preferred conveyor, the rotary axle of the driving wheel is supported on the frame using a linear guide such that it can move in a translatory manner, wherein the guidance direction of the linear guide extends substantially parallel to the adjacent region of the conveying section. A sliding guide is used particularly preferably as the linear guide. The orientation of the linear guide, which is provided, substantially matches the direction of vibration of the rotating conveying means, and so the damping device is as effective as possible. In addition, the support that is provided is so space-saving that it can be easily disposed between the conveying section and the return section of the conveying means.

In the case of another preferred conveyor, a lever arm is provided that is supported at a first end in a rotational manner on the frame, wherein the driving wheel is rotatably accommodated on a second end that is opposite the first end, the damping device damping the rotational motion of the lever arm. Although a lever arm requires more space than the linear guide described above, it is much less expensive to manufacture. In addition, only pivot bearings are required, which are available as cost-effective, low-wear standard parts e.g. in the form of radial deep-groove ball bearings. It should be noted that the length and orientation of the lever should be selected such that the rotary axle of the driving wheel moves at least approximately parallel to the adjacent region.

In the case of a preferred conveyor, the driving wheel is disposed adjacent to a drive of the endless conveying means. The effects of stick-slip vibration in the form of speed differences between the conveying section and the return section of the conveying means are often the greatest in the vicinity of the drive, and so this is where the damping has the greatest effect. At the same time, the drive is stressed particularly greatly by the aforementioned vibrations, and so the proposed placement of the driving wheel reduces the stress on the drive and thereby increases its service life. In the case of a preferred conveyor, the endless conveying means is designed in the form of a chain having a large number of separate chain links, each chain link including a transport plate; the transport plates define the conveying surface. A conveyor of that type is known from U.S. Pat. No. 4,961,492 A. The invention is particularly advantageous for a conveyor of that type because that is where stick-slip vibrations are particularly strong, and because that is where a particularly space-saving damping device is required.

In the case of a particularly preferred conveyor, the chain links are composed of plastic, wherein adjacent chain links are rotationally connected to each other in at least two directions. A chain conveyor of that type is known from U.S. Pat. No. 6,779,652 B2. Chain conveyors of that type are subjected to particularly high wear, and so the damping device that is provided is particularly advantageous in combination with chain conveyors of that type.

BRIEF DESCRIPTION OF THE DRAWINGS

The present invention is explained in greater detail below with reference to the attached drawing. It shows.

DETAILED DESCRIPTION OF THE PREFERRED EMBODIMENTS

Figure 1:
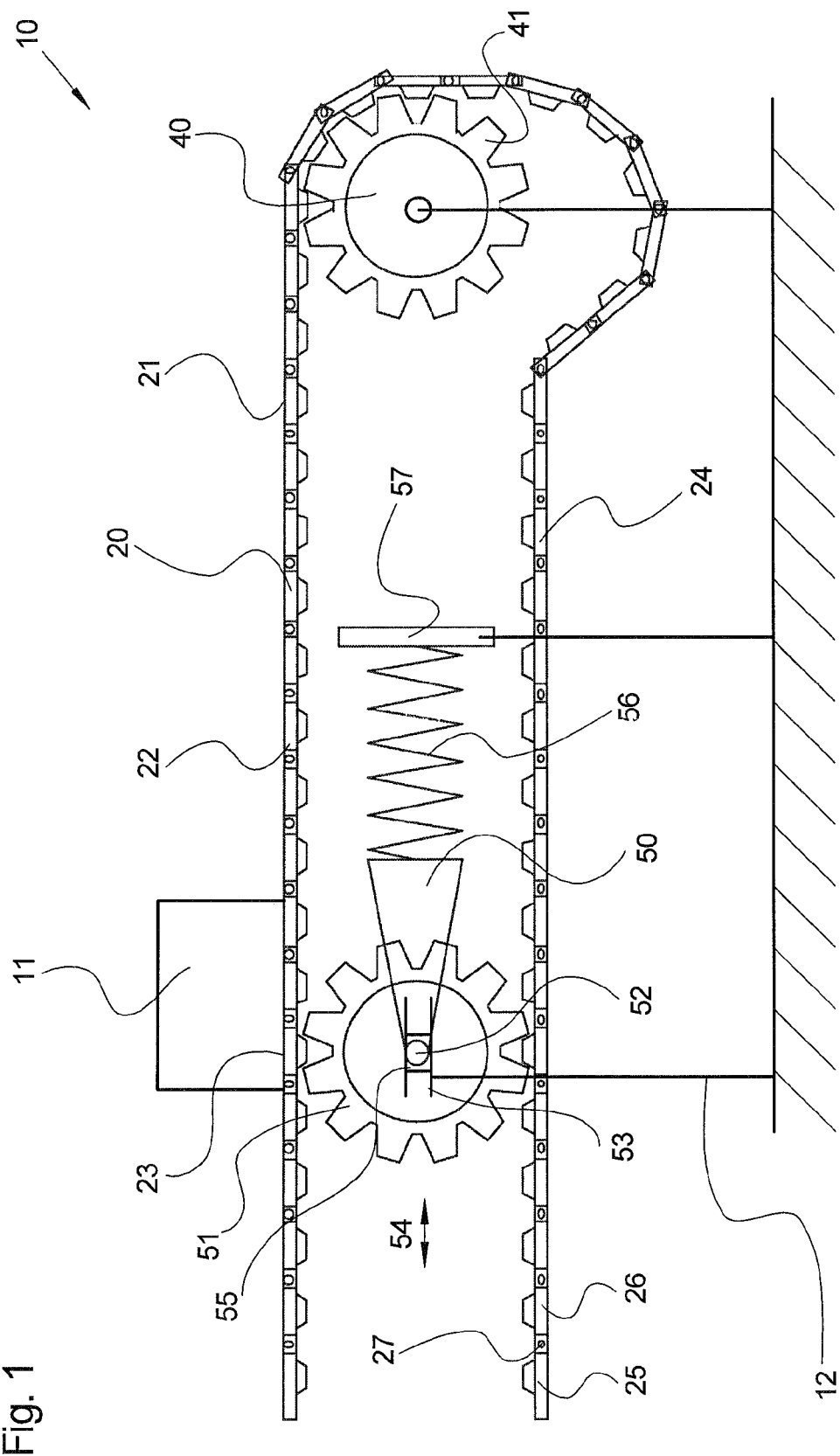
FIG. 1: a basic schematic side view of a conveyor according to the invention.

FIG. 1 shows a conveyor 10 according to the present invention. Conveyor 10 includes an endless conveying means 20, only a subsection of which is shown, however. Endless conveying means 20 is designed as described in U.S. Pat. No. 6,779,652 B2. U.S. Pat. No. 6,779,652 B2 is therefore referenced here and its entire contents are incorporated in the contents of the present application. Accordingly, endless conveyor 20 is a chain conveyor having chain links 25 that are injection-molded of plastic. Each chain link 25 includes a substantially flat transport plate 26, wherein transport plates 26 in totality define a conveying surface 21. It should be noted that, instead of flat transport plate 26, a large number of other transport plates are also known, the shape of which is adapted in a particular manner to goods 11 to be conveyed.

Every two adjacent chain links 25 are interconnected by a flexible coupling 27 that has two rotational degrees of freedom, thereby enabling conveying means 20 to run with any type of curvature at all in three dimensions. To this end, frame 12 includes a row of (not-depicted) guide means for conveying means 20, the design of which is described in U.S. Pat. No. 4,961,492 A. U.S. Pat. No. 4,961,492 A is therefore referenced here and its entire contents are incorporated in the contents of the present application.

In addition to deflection roller 40 that is shown, at least one further (not-depicted) deflection roller is rotatably supported on frame 12, the two deflection rollers being identical in design. Deflection rollers 40 have a large number of teeth 41 which engage in conveying means 20 in a form-fit manner, thereby establishing a driving connection between deflection roller 40 and conveying means 20. Deflection roller 40 that is shown is also connected to a (not-depicted) drive in the form of an electric motor, thereby enabling conveying means 20 to be set into rotation using deflection roller 40 such that it circulates endlessly.

Since conveying means 20 is endless, designed as a closed ring, it includes a return section 24 in addition to conveying section 22 having conveying surface 21, return section 24 extending largely parallel to conveying section 22. The guidance of conveying sections 22; 24 of conveying means 20 is realized, for example, using an extruded aluminum part, wherein conveying section and return section 22; 24 are guided in a gliding manner on two opposite sides of the aluminum profile.

A driving wheel 51 that is identical to deflection wheels 40 is provided between conveying section and return section 22; 24 of conveying means 20. Driving wheel 51 engages via its teeth in a form-fit manner in conveying section and return section 22; 24 of conveying means 20, thereby establishing a driving connection with both sections 22; 24. When conveying section and return section 22; 24 move at the same speed, driving wheel 51 simply rotates. As soon as stick-slip vibrations occur in conveying means 20, conveying section and return section 22; 24 of conveying means stop moving at the same speed. As a result, driving wheel 51 continues to rotate but is also displaced in a translatory manner and, in fact, parallel to adjacent region 23 of conveying section 22 of conveying means 20. To ensure that this motion occurs in a controlled manner, rotary axle 52 of driving wheel 51 is accommodated in a linear guide 53 such that it can move in a straight line, wherein guide direction 54 of linear guide 53 extends parallel to adjacent region 23 of conveying section 22 of conveying means 20. A sliding guide is preferably used as linear guide 53, runners 55 of which are equipped with a pivot bearing that enables driving wheel 51 to rotate.

Runner 55 is connected by a spring 56 to frame 12. Spring 56 is preloaded to such an extent that driving wheel 51 engages therein in without play, independently of the state of vibration of conveying means 20. In order to maintain this state even after sustained operation of conveyor 10, spring 56 is supported on a stop 57 on frame 12, the stop 57 being displaceable in guide direction 54. As soon conveying means 20 shows signs of wear, as evidenced by a lengthening of conveying means 20, the stop 57 is displaced so far that spring 56 is sufficiently preloaded once more.

Special friction-producing means are not provided in damping device 50 since the actual vibration damping is achieved by the friction between conveying means 20 and the assigned guide components.

It will be understood that each of the elements described above, or two or more together, may also find a useful application in other types of constructions differing from the types described above.

While the invention has been illustrated and described as embodied in a battery-operated screwdriver, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

LIST OF REFERENCE NUMERALS

| | |
|---|---|
| 10 | Conveyor |
| 11 | Conveyed goods |
| 12 | Frame |
| 20 | Conveying means |
| 21 | Conveying surface |
| 22 | Conveying section |
| 23 | Region of the conveying section adjacent to the driving wheel |
| 24 | Return section |
| 25 | Chain link |
| 26 | Transport plate |
| 27 | Flexible coupling |
| 40 | Deflection roller |
| 41 | Tooth |
| 50 | Damping device |
| 51 | Driving wheel |
| 52 | Rotary axle |
| 53 | Linear guide |
| 54 | Guide direction |
| 55 | Runner |
| 56 | Spring |
| 57 | Stop |

What is claimed is:

1. A conveyor (10), comprising:
at least one endless conveying means (20) having a conveying section (22) with a conveying surface (21), wherein said conveying surface (21) is configured for conveying conveyed goods (11);
a frame (12), wherein the conveying means (20) is held on the frame (12) using at least two deflection rollers (40), such that said conveying means (20) is configured to circulate endlessly in an endless circulating motion;
a driving wheel (51) having a rotary axle (52), wherein the driving wheel (51) differs from the deflection rollers (40), wherein said driving wheel (51) is coupled to the conveying means (20) such that the driving wheel (51) is adapted to be set into a rotational motion by the conveying means (20);
a damping device (50), wherein the rotary axle (52) of the driving wheel (51) is coupled to the damping device (50) such that vibrations in the endless circulating motion of the conveying means (20) are damped,
wherein the rotary axle (52) of the driving wheel (51) is supported on the frame (12) such that said rotary axle (52) is adapted to move with a translatory motion, and wherein the damping device (50) is configured to dampen the translatory motion of the rotary axle (52), wherein the conveying section (22) passes the driving wheel (51) substantially in a straight line.

2. The conveyor according to claim 1, wherein the conveying means (20) include a return section (24) that differs from the conveying section (22), wherein the return section (24) is disposed substantially parallel to the conveying section (22), wherein the driving wheel (51) is disposed between the conveying section and the return section (24), wherein the return section (24) passes the driving wheel 51 substantially in a straight line and wherein the driving wheel (51) is connected in a driving manner to the conveying section (22) and to the return section (24).

3. The conveyor according to claim 1, wherein the damping device (50) includes a spring, wherein said damping device (50) is supported on the frame (12) via said spring.

4. The conveyor according to claim 3, wherein the spring is supported on the frame by a displaceable stop (57).

5. The conveyor according to claim 1, further comprising a linear guide (54) having a guidance direction, wherein the rotary axle (52) of the driving wheel (51) is supported on the frame (12) via said linear guide (53) such that the rotary axle (52) is adapted to move in a translatory manner, wherein the guidance direction (54) of the linear guide (53) extends substantially parallel to a region (23) that is adjacent to the conveying section (22).

6. The conveyor according to claim 1, further comprising a lever arm, wherein the lever arm is supported at a first end in a rotational manner on the frame (12), wherein the driving wheel (51) is rotatably accommodated on a second end that is opposite the first end, and wherein the damping device (50) is configured to damp the rotational motion of the lever arm.

7. The conveyor according to claim 1, further comprising a drive configured to drive the endless conveying means (20), wherein the driving wheel (51) is adjacent to the drive of the endless conveying means (20).

8. The conveyor according to claim 1, wherein the endless conveying means (20) is formed as a chain having a plurality of separate chain links (25), wherein each said chain link (25) includes a transport plate (26), wherein the transport plates (26) define the conveying surface (21).

9. The conveyor according to claim 8, wherein the chain links (25) are composed of plastic, wherein adjacent chain links (25) are rotationally connected to each other in at least two directions.

10. A conveyor (10), comprising:
at least one endless conveying means (20) having a conveying section (22) with a conveying surface (21), wherein said conveying surface (21) is configured for conveying conveyed goods (11);
a frame (12), wherein the conveying means (20) is held on the frame (12) using at least two deflection rollers (40), such that said conveying means (20) is configured to circulate endlessly;

a driving wheel (51) having a rotary axle (52), wherein said driving wheel (51) is coupled to the conveying means (20) such that the driving wheel (51) is adapted to be set into a rotational motion by the conveying means (20);

a damping device (50), wherein the rotary axle (52) of the driving wheel (51) is coupled to the damping device (50) such that vibrations in the rotation of the conveying means (20) are damped, wherein the rotary axle (52) of the driving wheel (51) is supported on the frame (12) such that said rotary axle (52) is adapted to move with a translatory motion, and wherein the damping device (50) is configured to dampen the transiatory motion of the rotary axle (52); and a lever arm, wherein the lever arm is supported at a first end in a rotational manner on the frame (12), wherein the driving wheel (51) is rotatably accommodated on a second end that is opposite the first end, and wherein the damping device (50) is configured to damp the rotational motion of the lever arm.

* * * * *